Dec. 12, 1933.    F. S. HAAS    1,938,762
GRINDING MACHINE
Filed Jan. 4, 1930    4 Sheets-Sheet 1

Inventor
FREDERICK S. HAAS
By
Parsons
Attorney

Dec. 12, 1933.  F. S. HAAS  1,938,762
GRINDING MACHINE
Filed Jan. 4, 1930  4 Sheets-Sheet 2
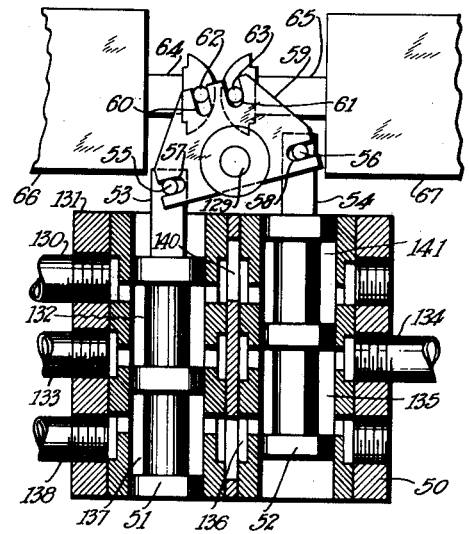
Fig. 5
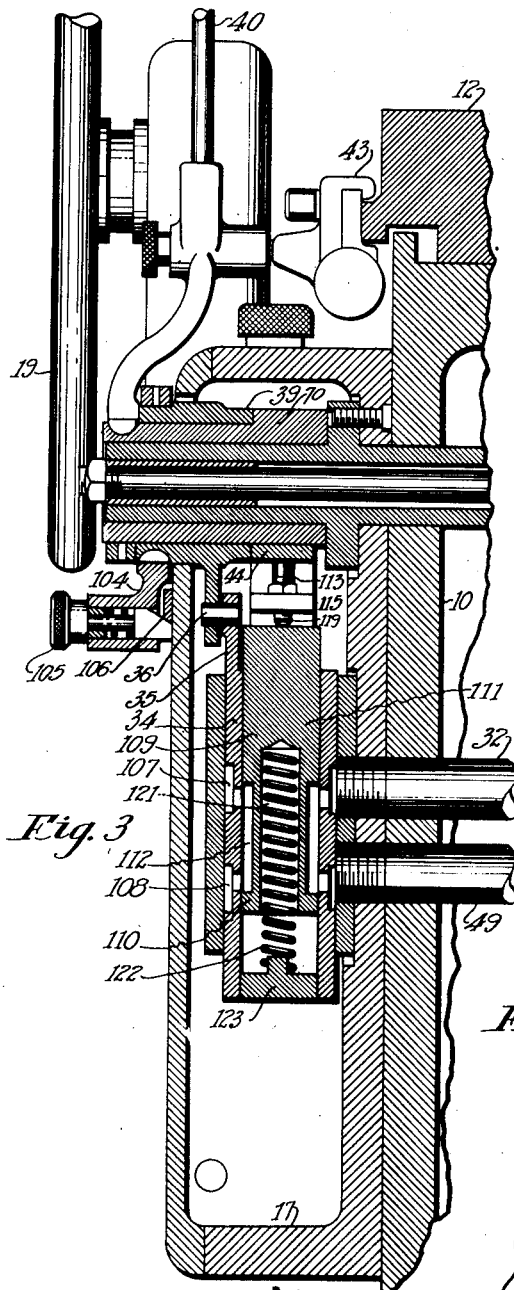
Fig. 3
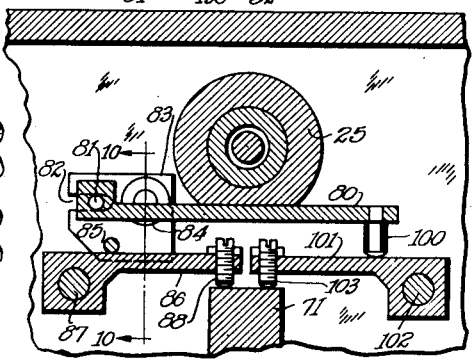
Fig. 8
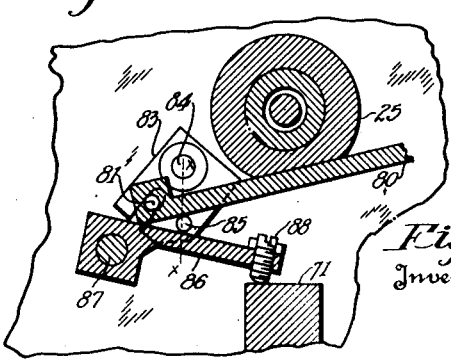
Fig. 9
Fig. 10
Inventor
FREDERICK S. HAAS
By H. H. Parsons
Attorney Dec. 12, 1933.  F. S. HAAS  1,938,762
GRINDING MACHINE
Filed Jan. 4, 1930   4 Sheets-Sheet 3

Inventor
FREDERICK S. HAAS
By H. K. Parsons
Attorney

Dec. 12, 1933.  F. S. HAAS  1,938,762
GRINDING MACHINE
Filed Jan. 4, 1930    4 Sheets-Sheet 4

Inventor
FREDERICK S. HAAS

By  HK Parsons
Attorney

Patented Dec. 12, 1933

1,938,762

UNITED STATES PATENT OFFICE 1,938,762

GRINDING MACHINE

Frederick S. Haas, Cincinnati, Ohio, assignor to Cincinnati Grinders Incorporated, Cincinnati, Ohio, a corporation of Ohio Application January 4, 1930. Serial No. 418,631

23 Claims. (Cl. 121—45)

This invention relates to improvements in machine tools and especially to improvements in machines having parts translatable one relative to the other.

An object of this invention is to provide in a machine tool, improved means for controlling the reciprocation of one part relative to another.

Another object of this invention is to provide in a machine tool organization, improved hydraulic and electric means for controlling the translation of one part relative to another supporting part.

Another object of the invention is to provide in a machine tool organization, improved means for reversing the translation of one member thereof whereby extremely short work pieces may be expeditiously handled.

A further and specific object of the invention is to provide in a grinding machine of the center type, improved means for controlling the translation of the table thereof, both during the grinding operation and at the time of reversal thereof.

A more specific object of the invention is the provision of a grinding machine embodying a translatable work support that may be translated at various work speeds as well as at a rapid traverse speed.

Other objects and advantages of the present invention should be readily apparent by reference to the following specification, considered in conjunction with the accompanying drawings, and it is to be understood that I may make any modifications in the specific structural details hereinafter described, within the scope of the appended claims, without departing from or exceeding the spirit of the invention.

In the drawings:

Figure 3 is a sectional view taken on line 3—3 of Figure 2;

Figure 5 is a sectional view through the reversing valves forming a detail of the invention;

Figure 8 is a sectional view taken on line 8—8 of Figure 4;

Figure 9 is a fragmentary view of the parts shown in the lefthand side of Figure 8 in an operative position; and Figure 10 is a sectional view on line 10—10 of Figure 8.

Throughout the several views of the drawings, like reference characters are employed to denote like or corresponding parts.

Figure 1:
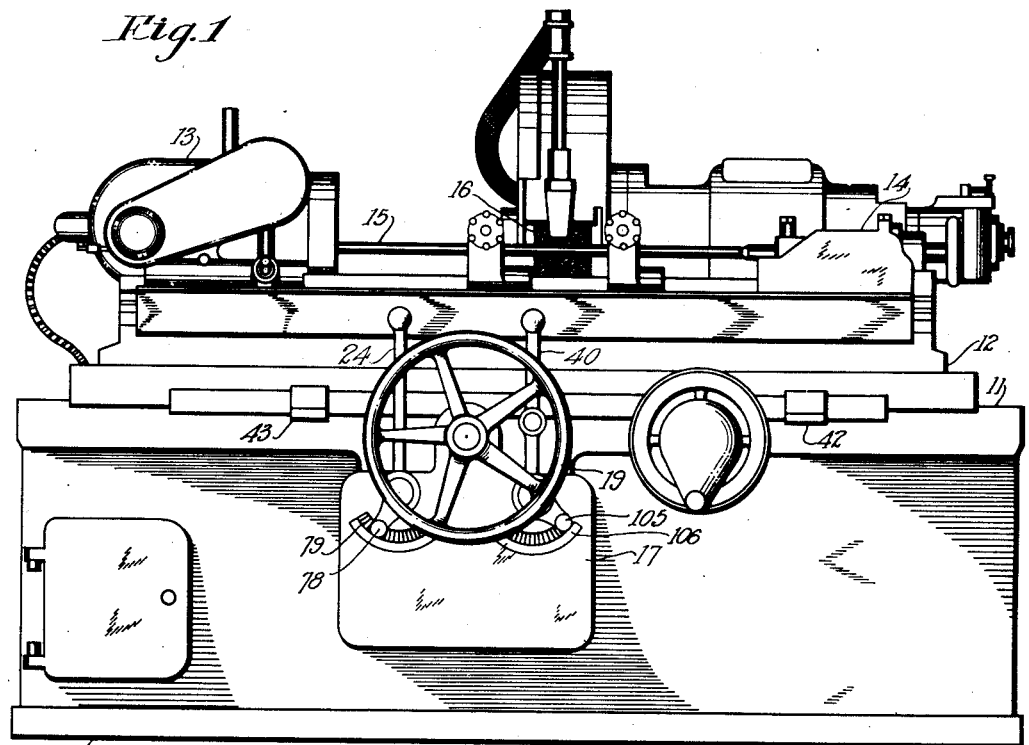
Figure 1 is a front elevation of a grinding machine embodying the improvements of this invention.
Figure 2:
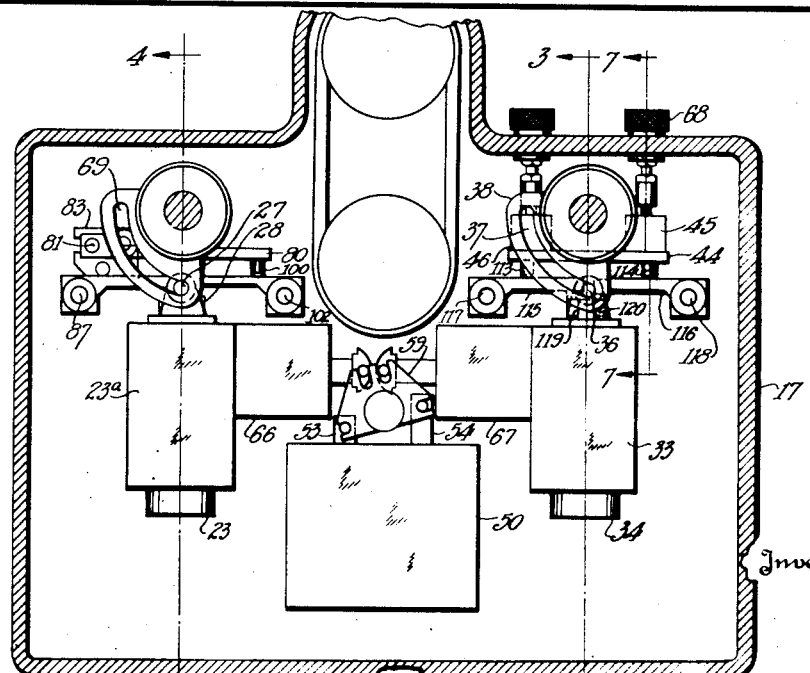
Figure 2 is a sectional view through the housing enclosing the improved control mechanism.

In general, a device of this invention comprises a bed 10 having formed thereon ways 11 for supporting the work table 12 during the translation thereof. The table 12 supports the usual headstock 13 and tailstock 14 for rotatably supporting a work piece 15 and presenting same to a grinding wheel 16. The work table 12 and grinding wheel 16 are adapted to be moved toward and from one another, for feeding the grinding wheel or work one into the other to effect a stock removal from the work. Any suitable mechanism may be employed for so doing. Mounted on the forward end of the bed 10 is a box 17 containing the control mechanism for controlling the reciprocation of the table 12.

Figures 4, 6, 7:
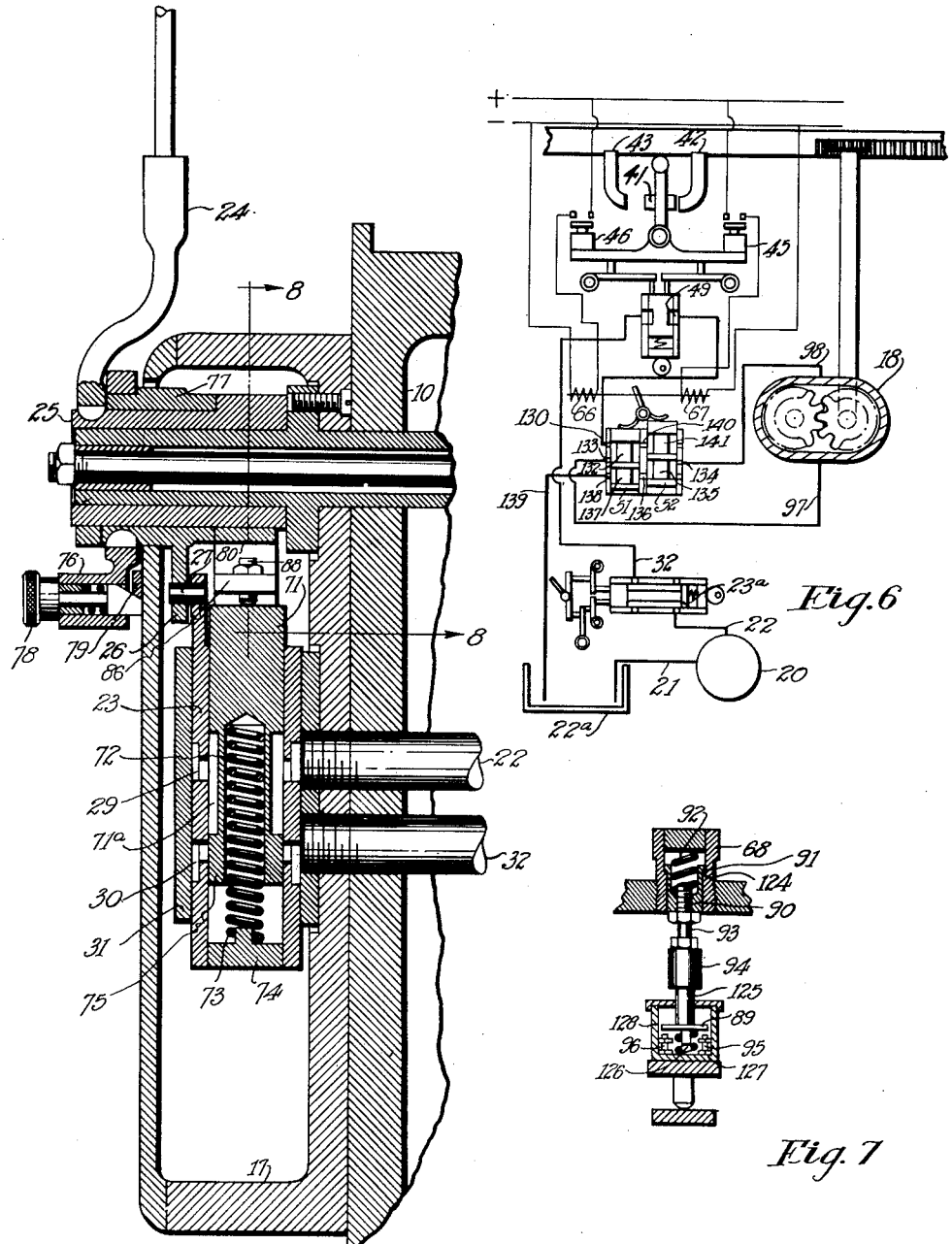
Figure 4 is a sectional view taken on line 4—4 of Figure 2.
Figure 6 is a diagrammatic view illustrating the hydraulic and electrical circuits involved in this invention.
Figure 7 is a sectional view on line 7—7 of Figure 2.
Figure 11:
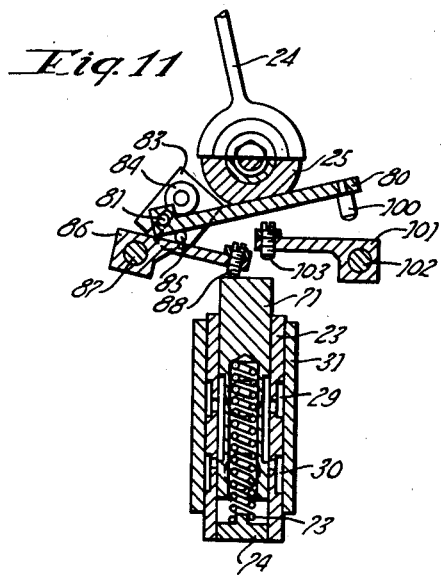
Figures 11 and 12 illustrate the starting and stopping valve in two different positions of adjustment.
Figure 13:
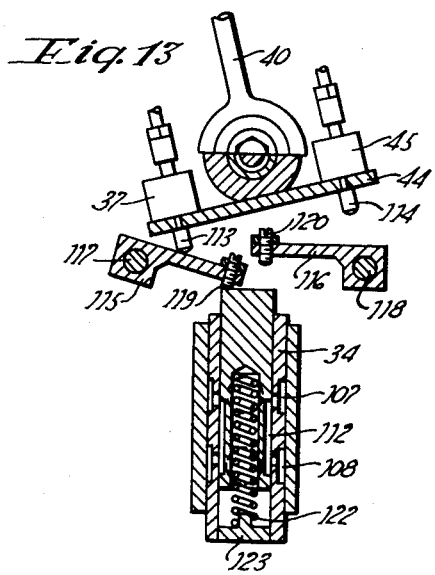
Figures 13 and 14 illustrate deceleration valve in two different positions of adjustment.
Figure 12:
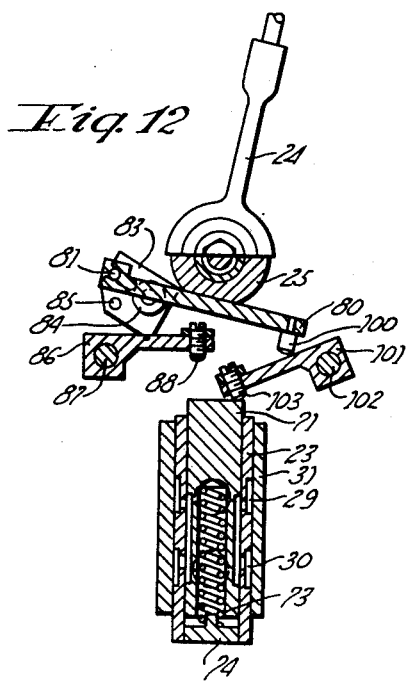
Figure 14:
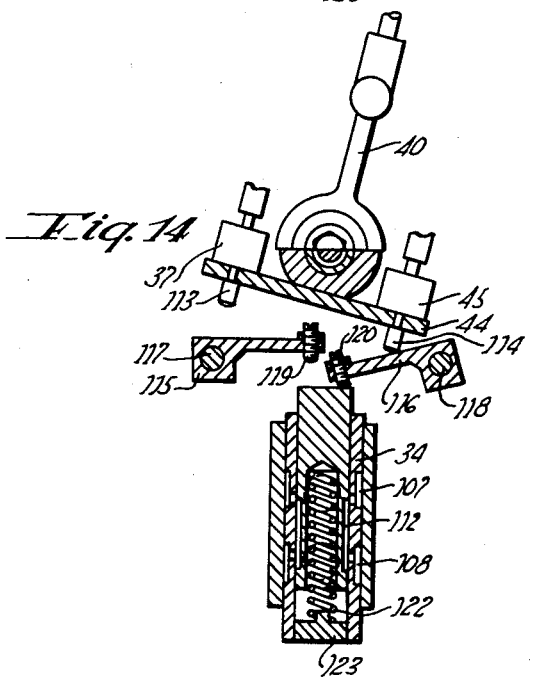

The table 12 is adapted to be reciprocated by a hydraulic motor 18, shown diagrammatically in Figure 6 and forming no part of this application, which motor 18 is adapted to be reversely rotated by reversing the flow of fluid therethrough, for thereby effecting reverse movement or translation of the table 12. Means may also be provided for disconnecting the motor 18 from the table 12 so that the said table may be reciprocated by and through the hand wheel 19. This invention pertains primarily to the automatic control of the power means, both in the direction of rotation of the motor 18 and the speed at which it may be so rotated, which will now be described, referring to the diagrammatic view and to the various sectional structural views.

A pump 20, having an intake line 21 and discharge line 22, is employed for circulating a hydraulic medium, which may be contained in a suitable tank or the like 22a interiorly of the bed 10.

Discharge line 22 terminates at the starting and stopping valve, indicated generally by the numeral 23a, operated by manual lever 24 mounted on the forward face of the box 17. Starting and stopping lever 24 is keyed, or otherwise secured, to a sleeve 25 rotatably journaled on a sleeve 77, which sleeve 77 has integral with it a cam plate 26 having a cam groove 69 formed therein, through which a pin 27 on the valve sleeve stem 28 extends. The stem 28 is integral with a valve sleeve 23 which is provided with and has extending therethrough, intake port 29 and exhaust port 30 adapted to register with similar ports formed in a casing 31 surrounding the valve sleeve 23 and into which inlet line 22 and exhaust line 32 are respectively secured. A piston 71 is enclosed within the valve sleeve 23 having a reduced portion 71a for connecting inlet and exhaust ports 22 and 32 and is provided with a bore 72 for receiving a spring 73. The other end of the spring 73 abuts a plug or cap 74 carried by the end of the sleeve 23. The spring 73 tends yieldingly to urge the piston 71 upwardly to maintain contact between the upper end thereof and an adjustable stop or actuating member 88 carried by a lever 86 pivotally secured at 87 to the rear wall of box 17. The piston 71 is provided with a head 75 acting as a valve to control the flow of fluid through the outlet port 30 and normally closes off said port, as shown in Figure 4. In order to translate the table 12 at the proper rate, the sleeve 23 may be adjusted relative to the valve head 75, to more or less restrict the flow of the medium through the ports 29 and 30. This adjustment is accomplished through the cam plate 26 operated by the lever 76 keyed, or otherwise secured, to the sleeve 77 integral with said cam plate 26, and the lever 76 may be locked in adjusted positions by the spring pressed knob 78 carried by the free end thereof, co-operating with the serrated plate 79 fixed on the face of housing or box 17. To effect a flow of the hydraulic medium through the starting valve 23a, lever 24 is actuated to the left, as seen in Figure 1, thereby rotating sleeve 25 in a counter-clockwise direction, together with the bar 80 carried thereby. This bar has secured to its one end a pin 81 received in a slot 82 formed in a plate 83 for actuating said plate about its pivot 84 to cause the pin 85 carried by the plate and engaging the upper surface of lever 86, to actuate said lever about its pivot and, through the adjustable stop 88, to depress the piston against the yielding resistance of spring 73 to open the inlet port 29 the desired amount according to the adjustment of valve 23, above described.

The lever 24 and sleeve 25 are actuated sufficiently to cause the bar 80 to rotate plate 83 about its pivot a distance sufficient to bring the pin 85 beyond the center of its arcuate path of movement or beyond a point indicated substantially by the line X—X in Figure 9, to thereby lock the parts in this position. The relationship of the parts just described is shown substantially in Figure 9, at which time the starting valve is open and the table is being reciprocated. Spring 73 is tending to raise piston 70, causing a pressure to be exerted against the pin 85 tending to move the same to its normal position. This, however, merely locks the parts more firmly in position until the lever 24 and sleeve 25 are again actuated to bring the pin 85 beyond the center of the pivot 84, when the spring will close the starting valve.

The foregoing description deals with controlling the rotation of motor 18, to cause the table 12 to be translated at a grinding rate of speed, which is relatively slow. Means are also provided to effect a rapid traverse movement or translation of the table, which may be utilized, for instance, to cover the distance or space between remote portions of a work piece that is being operated upon, such as shafts having a bearing portion on each end. This is accomplished by actuating lever 24 about its pivot to the right, as seen in Figure 1, or in a clockwise direction, similarly actuating sleeve 25 and bar 80 to cause pin 100 carried by the other end thereof to actuate lever 101 about its pivot 102, thereby depressing piston 71 through the adjustable pusher 103 carried by the free end thereof. Piston 71 is shifted a distance to completely uncover or open port 30 to permit an unrestricted flow of fluid therethrough to motor 18 to rapidly rotate same.

Discharge line 32 of valve 23a forms an intake line for conveying the hydraulic medium from the starting and stopping valve to the deceleration valve 33, which controls the rate of movement of the table 12 at each end of its stroke, gradually slowing down said movement to the point of reversal and gradually increasing same after reversal. This valve 33 is similar in construction to the valve 23a and comprises a sleeve 34 from which the stem 35 extends having a pin 36 received in a cam slot 37 formed in plate 38 integral with a sleeve 39. A lever 104 is secured to the sleeve 39 for actuating same and has a spring locking knob 105 carried by its free end co-operating with a serrated locking plate 106 carried by the face of control box 17, to lock said lever in its adjusted positions. The valve sleeve 34 is provided with inlet port 107 and exhaust port 108 registering with inlet and discharge lines 32 and 49. The flow of the hydraulic medium through the inlet port 107 is at all times unrestricted but the flow through outlet port is gradualy cut off just prior to the reversal of the table. To this end, the sleeve 34 is provided interiorly thereof with a piston valve 109 having a head 110 and a shoulder 111 acting as the shutoff valve. The head 110 and shoulder 111 are formed by a reduced portion 112 which forms a means for connecting inlet and exhaust ports 107 and 108. In practice and during operation on a work piece, as noted above, both inlet and exhaust ports 107 and 108 are open or unrestricted but as the table or member 12 nears the end of its stroke, piston valve 109 is depressed, causing shoulder 111 to gradually cut off the flow of fluid through the inlet port 107 to thereby gradually cut down the rotation of motor 18. It should be noted that inlet port 107 is never completely closed and consequently the motor 18 never stopped and that the amount of closing of said port 107 and deceleration of rotation of motor 18 is determined by means to be described later.

To effect a reversal of the motor 18 and to actuate the deceleration piston valve 109, the following mechanism is employed. A reversing lever 40 is keyed, or otherwise secured, to the end of a sleeve 70 journaled interiorly of sleeve 39 and the lever has extending intermediate its ends toward the table 12 a pin or abutment 41 adapted to be engaged by dogs 42 and 43 mounted respectively at the right and left hand ends of the table 12, as viewed in Figure 1. A switch bar 44 is secured to the sleeve 70 and adapted to oscillate with the said sleeve, for closing a pair of switches 45 and 46 carried thereby. Switches 45 and 46 control the position of the reversing valves, which valves determine the direction of rotation of hydraulic motor 18, which will be described in detail later. The switch bar 44 has depending from its under side, a pair of push pins 113 and 114 engaging respectively the upper surfaces of levers 115 and 116 pivoted respectively at 117 and 118 to the rear wall of control box 17. The levers 115 and 116 carry at their free ends an adjustable valve actuator indicated respectively at 119 and 120 engaging the upper surface of piston valve 109 for actuating said valve when the reverse lever 40 is actuated. The valve 109 has a bore 121 providing a shoulder forming an abutment for one end of a spring 122 yieldingly resisting movement of the valve 109 by the lever 40 and returning the valve to its normal operative position. The spring 122 abuts, on its opposite end, a plug or cap 123 secured in the end of sleeve 34. From the foregoing, it will be noted that as the lever 40 is actuated, either to the right or left, by the engagement of either dog 43 or 42, the piston valve 109 will be actuated by either of the actuators 119 or 120, to cause shoulder 111 to cut off the flow of the hydraulic fluid through the inlet port 107 to the reversing valve indicated generally at 50.

The hydraulic medium is conveyed through a conductor 49 to the reversing mechanism which comprises a pair of valves 51 and 52 mounted adjacent one another and shiftable through vertical parallel planes. Valves 51 and 52 are respectively provided with stems 53 and 54 carrying at their upper ends, pins 55 and 56 received in slots 57 and 58 formed in a plate 59 movable about pivot 129. The other end of plate 59 is provided with slots 60 and 61 which receive pins 62 and 63 carried respectively by cores 64 and 65 of solenoids 66 and 67. The energization of either of the solenoids 66 or 67 rocks the plate 59 about its pivot 129 and determines the position of the valves 51 and 52 by shifting one in one direction and the other in the other direction and thereby the direction of flow of the hydraulic medium through the hydraulic motor 18, for rotating same either in a clockwise or counter-clockwise direction to effect a translation of the table 12 either to the right or to the left. Solenoid 66 is electrically connected with the switch 46, while solenoid 67 is similarly electrically connected with the switch 45, so that, as the lever 40 is actuated, one or the other of the switches is closed for actuating its solenoid, to effect the reversal of rotation of motor 18 as above noted.

Switches 45 and 46 are adapted to have their contacts adjusted one with respect to the other, so that the time elapsed between the engagement of the table dogs with the reversing lever may vary, whereby the table movement may be reversed in a minimum of travel. The switches 45 and 46 are duplicates of one another and each includes an adjusting thumb nut 68 threadedly received in the upper wall of control box 17 so as to be accessible to the operator at any time for adjusting the contact 89. Thumb nut 68 has a bore therein to provide a shoulder 124 cooperating with a flange 91 formed on thimble 90 to limit the movement thereof relative to the nut in one direction but permitting same to be moved in the opposite direction against the yielding resistance of spring 92. A stem 93 is carried to the thimble 90 and abuts a push button 94 also provided with a stem 125 carrying on one end the bridge contact 89 for connecting contacts 95 and 96 to which the main electric wires are attached. A spring or other yielding means 126 is interposed between the base 127 of switch casing 128 and the bridge contact 89, to normally hold them out of contact with one another.

From the foregoing, it will be understood that as thumb nut 68 is adjusted, shoulder 124 is shifted axially and that thimble 90 will shift accordingly under influence of spring 92 to maintain engagement between flange 91 and shoulder 124, thereby causing bridge contact 89 to approach or recede from the contacts 95 and 96. It is therefore apparent that the arc of movement of reverse lever 40 after being engaged by the table dogs, will be greater or less accordingly, whether or not the contact 89 is near or remote from contacts 95 and 96 and therefore the translation of the table may be reversed within a minimum distance.

The hydraulic medium, as shown in Figure 6 and as noted above, passes from the deceleration valve 33 through conductor 49 to the inlet port 130 of reversing valve casing 131 around the reduced portion 132 of valve 51, where it is directed out through exhaust port 133 to conductor 97 to one side of motor 18. The return of the medium will be through motor 18 to conductor 98 to port 134 in casing or housing 131 around reduced portion 135 of valve 52, then through port 136 and around reduced portion 137 of valve 51 to exhaust port 138, from whence it is conveyed by conductor 139 to the sump or tank 22a. The above circuit will cause a translation of the table in one direction and upon engagement of the table dogs with the reversing lever, valves 51 and 52 will be shifted, at which time the flow of the hydraulic medium will be as follows: from the deceleration valve 33 through conductor 49 to the inlet port 130, around the reduced portion 132 of valve 51, through port 140 and then around the reduced portion 141 of valve 52 out through port 134 to conductor 98 to the motor 18. The return of the medium will then be through conductor 97 to port 133 around the reduced portion 137 of valve 51 and out exhaust port 138 to return or exhaust line 139 for discharge into sump or tank 22a.

From the foregoing it will be noted that there has been provided a machine tool organization having a member such as table 12 translatable relative to its support at a number of different work rates, as well as at a rapid traverse rate, together with means for controlling said rate both during the operation on a work piece and at the instant of reversal of the translation of the member.

What is claimed is:

1. In a machine tool organization the combination of a support, a member translatable thereover, hydraulic means for effecting said translation including a hydraulic medium and a conduit therefor, a reversing valve for controlling the direction of flow of the medium through the conduit, magnetic means for effecting the reversal of the valve, a reversing lever pivotally mounted on the support operable by the table, and means operable by the lever for energizing the magnetic means.

2. In a machine tool organization the combination of a support, a member translatable thereover, hydraulic means for effecting said translation including a hydraulic medium and a conduit therefor, a reversing valve for controlling the direction of flow of the medium through the conduit, and magnetic means for effecting the reversal of the valve, said means including a lever, a pair of actuating means carried by the member for actuating the lever about its pivot, a switch bar carried by the lever and electric switches operated by the bar to energize the magnetic means.

3. A mechanism for controlling the translation of a member of a machine tool organization comprising a hydraulic motor, a hydraulic medium for actuating the motor, a conduit for the medium, means including a start and stop valve for controlling the flow of the medium through the conduit and comprising an adjustable sleeve having ports therein, a piston valve reciprocable through the sleeve for opening and closing the ports, a cam for adjusting the sleeve to more or less restrict the port relative to the valve, a manual lever for actuating the cam, and a starting and stopping lever for actuating the piston valve.

4. In a mechanism for controlling the translation of a member of a machine tool organization comprising hydraulic means for effecting said translation including a hydraulic medium and a conduit therefor, means for controlling the flow of the medium through the conduit, and adjustable means controlling the rate of flow of the medium through the conduit just prior to the end of the stroke of the member and including a sleeve having ports therein, a piston within the sleeve for restricting the flow through the ports, means for adjusting the sleeve and locking same in adjusted positions relative to the piston for varying the restricted flow, and means operable by the translatable member for actuating the piston.

5. In a machine tool organization the combination of a support, a member translatable thereover, hydraulic means for effecting said translation including a hydraulic medium, a hydraulic motor for rotation by the medium, a conduit for the medium, means for controlling the flow of the medium through the conduit, means for controlling the direction of flow of the medium through the conduit, and means for controlling the last mentioned means including a pair of magnetic solenoids, electric switches electrically connected with the solenoids, and a lever operable by the translatable member for closing the switches to magnetically energize the solenoids.

6. In a machine tool organization the combination of a support, a member translatable thereover, hydraulic means for effecting said translation including a hydraulic medium and a conduit therefor, and means to control the direction of flow of the medium through the conduit including a reversing valve, magnetic means for actuating the valve, electrical means controlling the magnetic means comprising a switch and contacts associated with the switch, means operable by the translatable member for closing the switch to effect a reversal of the valve, and means for adjustably varying the distance between the contacts to thereby vary the point of reversal of the valve and consequently the point of reversal of the translation of the member.

7. A mechanism for controlling the translation of a member of a machine tool organization comprising a hydraulic motor, a hydraulic medium for actuating the motor, a conduit for the medium, means for controlling the flow of the medium through the conduit including a starting and stopping valve, a lever for actuating the valve, and means for locking the lever in an open position, said means including a bar carried by the lever, a pivotally mounted plate having a lost motion connection with the bar to be actuated thereby, and a valve actuator operatively connected with the plate, said parts being so related to interlock with one another in the open position.

8. In a machine tool organization the combination of a translatable member, a hydraulically actuated motor for effecting said translation, a hydraulic medium and a conduit therefor, means for reversing the flow of the medium through the conduit to effect a reverse translation of the member, a pivotally mounted reversing lever oscillated by the member, and electromagnetic means for operating the reversing means and energizable by the lever.

9. In a mechanism for controlling the translation of a member of a machine tool organization the combination of a hydraulically actuated motor for effecting said translation, a hydraulic medium for the motor, a valve for initiating a flow of the medium to the motor, adjustable means for controlling the flow of the medium through the valve to control the rate of translation of the member, means for actuating the valve to a position to cause a controlled flow therethrough, means for actuating the valve to a position to cause an unrestricted flow therethrough, and a lever for operating the two last mentioned means, said lever being pivotally mounted for actuation in opposite directions in a given plane and to operate one of said means when operated in one direction to initiate the flow of the medium at a controlled rate and the other of said means when operated in the other direction to initiate the flow of the medium at an uncontrolled rate.

10. In a mechanism for controlling the translation of a member of a machine tool organization the combination of a hydraulically actuated motor for effecting said translation, a hydraulic medium for the motor, a conduit for the medium, adjustable means for initiating and controlling the normal flow of the medium through the conduit to effect said translation of the translatable member at a normal feeding rate, means rendering the feeding adjustment means inoperative without varying the adjustment thereof to allow unrestricted flow of the medium through the conduit, and a common actuator for the two last named means interlocking the said means so that when one is in operative position the other is inoperative.

11. In a machine tool organization the combination of a translatable member, means including a hydraulic motor for effecting said translation, a hydraulic medium therefor, means determining the direction of flow through the conduit to control the direction of translation of the table including a pivotally mounted lever, a solenoid, a switch electrically connected therewith, a switch bar operatively associated with the lever, and means carried by the translatable member for engaging the pivoted lever to close the switch and magnetically control the direction determining means to reverse the flow of the medium.

12. In a machine tool organization the combination of a translatable member, hydraulic means for effecting said translation including a hydraulically actuated motor and a hydraulic medium therefor, means for reversing the flow of the medium to effect a reverse translation of the member, said means including a pair of piston valves shiftable in vertical parallel planes, a pivotally mounted actuator for jointly shifting the valves, electromagnetic means operatively connected with the actuator for effecting a movement thereof about its pivot, and a pivotally mounted lever oscillatable by the translatable member for energizing the electromagnetic means.

13. In a machine tool organization the combination of a translatable member, a hydraulic motor for effecting said translation, a hydraulic medium for controlling the motor, a conduit for the medium, means initiating a flow of the medium through the conduit, adjustable means controlling the rate of flow of the medium through the conduit, means determining the direction of flow of the medium through the conduit, electromagnetic means operatively connected with the direction determining means and controlled thereby, a pivotally mounted member for the electromagnetic means, adjustable means carried by the translatable member for engaging the pivotally mounted member for operating the electromagnetic means, and means for retarding the flow of the medium through the conduit prior to the reversal thereof.

14. In a mechanism for controlling the movement of the slide of a machine tool organization the combination of a hydraulic motor connected with the slide for effecting its movement, a hydraulic medium for actuating the motor, a conduit for the medium, and a valve unit in the conduit for initiating the flow of the hydraulic medium therethrough, controlling the rate of flow of the medium therethrough, for effecting an unrestricted flow therethrough, and for stopping said flow, said valve unit comprising a sleeve having intake and exhaust ports therein, a piston within the sleeve, yielding means for actuating the piston relative to the sleeve for closing one of said ports, and a lever actuable in one direction for partially opening said closed port for effecting a controlled flow therethrough and operable in the other direction for effecting an unrestricted flow therethrough.

15. In a mechanism for controlling the movement of the slide of a machine tool organization the combination of a hydraulic motor connected with the slide for effecting its movement, a hydraulic medium for actuating the motor, a conduit for the medium, and a valve unit in the conduit for initiating the flow of the hydraulic medium therethrough, controlling the rate of flow of the medium therethrough, for effecting an unrestricted flow therethrough, and for stopping said flow, said valve unit comprising a sleeve having intake and exhaust ports therein, a piston within the sleeve, yielding means for actuating the piston relative to the sleeve for closing one of said ports, a lever actuable in one direction for partially opening said closed port for effecting a controlled flow therethrough and operable in the other direction for effecting an unrestricted flow therethrough, and means for varying the position of the sleeve relative to the piston to vary the controlled flow of the fluid therethrough.

16. In a mechanism for controlling the movement of the slide of a machine tool organization the combination of a hydraulic motor connected with the slide for effecting its movement, a hydraulic medium for actuating the motor, a conduit for the medium, and a valve unit in the conduit for initiating the flow of the hydraulic medium therethrough, controlling the rate of flow of the medium therethrough, for effecting an unrestricted flow therethrough, and for stopping said flow, said valve unit comprising a sleeve having intake and exhaust ports therein, a piston within the sleeve, yielding means for actuating the piston relative to the sleeve for closing one of said ports, a lever actuable in one direction for partially opening said closed port for effecting a controlled flow therethrough and operable in the other direction for effecting an unrestricted flow therethrough, means for varying the position of the sleeve relative to the piston to vary the controlled flow of the fluid therethrough, and means for locking the sleeve in adjusted positions.

17. In a mechanism for effecting and controlling the translation of a work supporting table of a machine tool organization the combination of a hydraulic motor for effecting the translation of the table, a hydraulic medium for actuating the motor, a conduit for the medium, a valve in the conduit for effecting reverse flow of the medium through the conduit and operable at each end of the translatory stroke of the table, a lever operable by the table for effecting operation of the reversing valve, and an adjustable valve unit in the conduit for further controlling the rate of flow of the medium therethrough prior to and immediately following each reversal of the table and including a sleeve having intake and exhaust ports therein, a piston within the sleeve, yielding means for actuating the piston in one direction for normally establishing unrestricted flow between the intake and exhaust ports, means operable by the lever for actuating the piston against its yielding means for partially closing one of said ports, and means for varying the position of the sleeve relative to the piston to vary the amount of closing of the said port by the reverse lever and consequently varying the rate of flow of the medium before and after reversal.

18. In a mechanism for effecting and controlling the translation of a work supporting table of a machine tool organization the combination of a hydraulic motor for effecting said translation of the table, a hydraulic medium for actuating the motor, a conduit for the medium, a valve in the conduit for effecting reverse flow of the medium through the conduit and operable at each end of the translatory stroke of the table, a lever operable by the table for effecting operation of the reversing valve, and an adjustable valve unit in the conduit for further controlling the rate of flow of the medium therethrough prior to and immediately following each reversal of the table and including a sleeve having intake and exhaust ports therein, a piston within the sleeve, yielding means for actuating the piston in one direction for normally establishing unrestricted flow between the intake and exhaust ports, means operable by the lever for actuating the piston against its yielding means for partially closing one of said ports, means for varying the position of the sleeve relative to the piston to vary the amount of closing of the said port by the reverse lever and consequently varying the rate of flow of the medium before and after reversal, and means for locking the sleeve in adjusted positions.

19. In a machine tool organization of the class described the combination of a bed, a work supporting table mounted thereon for translation in opposite directions relative thereto, a hydraulic motor for effecting said translation of the table, a hydraulic medium for actuating said motor including a conduit therefor, a valve unit in the conduit for effecting reverse flow of the medium in the conduit for effecting the reverse translation of the table, a lever mounted on the bed adapted to be engaged by the table at each end of its stroke, a pair of switches associated with the lever and adapted to be individually closed by the lever, and electric means operable by the switches for reversing the valve.

20. In a machine tool organization of the class described the combination of a bed, a work supporting table mounted thereon for translation in opposite directions relative thereto, a hydraulic motor for effecting said translation of the table, a hydraulic medium for actuating said motor including a conduit therefor, a valve unit in the conduit for effecting reverse flow of the medium in the conduit for effecting the reverse translation of the table, a lever mounted on the bed adapted to be engaged by the table at each end of its stroke, a pair of switches associated with the lever and adapted to be individually closed by the lever, and electric means operable by the switches for reversing the valve, said electrical means comprising a pair of solenoids one being connected with each switch, a pivotally mounted actuator adapted to be oscillated about its pivot in opposite directions by the solenoids, and operative connections between the valve and actuator.

21. In a machine tool organization of the class described the combination of a bed, a work supporting table mounted thereon for movement relative thereto, hydraulic means including a motor, a hydraulic medium, and a conduit for the medium for effecting said movement of the table in opposite directions, a valve unit in said conduit for reversing the flow of the medium through the conduit comprising a pair of spool valves, said valves being simultaneously shifted in opposite directions, a pivotally mounted actuator having an operative connection with each valve, and electromagnetic means operable by the table at each reversal thereof for oscillating the valve actuator.

22. In a machine tool organization of the class described the combination of a bed, a work supporting table mounted thereon for movement relative thereto, hydraulic means including a motor, a hydraulic medium, and a conduit for the medium for effecting said movement of the table in opposite directions, a valve unit in said conduit for reversing the flow of the medium through the conduit comprising a pair of spool valves, said valves being simultaneously shifted in opposite directions, a pivotally mounted actuator having an operative connection with each valve, and electromagnetic means operable by the table at each reversal thereof for oscillating the valve actuator, said electromagnetic means comprising a pair of solenoids one for oscillating the actuator in each direction, a reversing lever operable by the table for oscillation at each reversal thereof, a switch bar associated with the lever, and a pair of switches one for each solenoid adapted to be independently closed.

23. In a machine tool organization of the class described the combination of a bed, a work supporting table mounted thereon for movement relative thereto, hydraulic means including a motor, a hydraulic medium, and a conduit for the medium for effecting said movement of the table in opposite directions, a valve unit in said conduit for reversing the flow of the medium through the conduit comprising a pair of spool valves, said valves being simultaneously shifted in opposite directions, a pivotally mounted actuator having an operative connection with each valve, and electromagnetic means operable by the table at each reversal thereof for oscillating the valve actuator, said electromagnetic means comprising a pair of solenoids one for oscillating the actuator in each direction, a reversing lever operable by the table for oscillation at each reversal thereof, a switch bar associated with the lever, a pair of switches one for each solenoid adapted to be independently closed, and means for varying the amount of oscillation of the reversing lever necessary to close said switches and thereby vary the length of reciprocatory stroke of the table.

FREDERICK S. HAAS.

DISCLAIMER 1,938,762.—*Frederick S. Haas*, Cincinnati, Ohio. GRINDING MACHINE. Patent dated December 12, 1933. Disclaimer filed May 11, 1936, by the patentee; the assignee, *Cincinnati Grinders Incorporated*, concurring and consenting.
Hereby enters this disclaimer to claims 1 and 19 of said patent.
[*Official Gazette June 2, 1936.*]